Sept. 24, 1963  W. M. WALKER  3,104,909
CHOKER HOOK

Filed June 4, 1962  2 Sheets-Sheet 1

William M Walker
Inventor

Sept. 24, 1963 W. M. WALKER 3,104,909
CHOKER HOOK

Filed June 4, 1962 2 Sheets-Sheet 2

William M. Walker
Inventor
Emmet S. Black
Atty.

United States Patent Office 3,104,909
Patented Sept. 24, 1963

3,104,909
CHOKER HOOK
William M. Walker, 5611 SE. 117th, Portland, Oreg.
Filed June 4, 1962, Ser. No. 205,477
5 Claims. (Cl. 294—75)

My invention relates to choker hooks used in the logging industry and particularly to those hooks in which the ferrule is released by remote control.

The principal objective of my invention is to be able to unhook a choker without making the operation a manual one.

Another objective is to be able to unhook a choker through the agency of a radio frequency oscillator signal to an electronic relay in a receiver carried by the choker hook.

Another objective is to be able to release the choker ferrule through a bottom opening in a choker hook.

A further objective is to provide means for supporting the choker ferrule within the hook which includes one or more chocks adapted to be withdrawn from contact with the ferrule to permit said ferrule to drop through or be pulled through the bottom of the choker hook.

Over the years many choker hooks have been invented among them the "Bardon" version which has become the standard in the logging industry. This hook employs a length of cable (wire rope) to each end of which is socketed a cylindrical ferrule. The choker hook itself (so called in the parlance of the industry) is a hollow casting, usually of manganese steel, provided with a T-shaped opening in one side thereof through which one of the ferrules may be entered and seated with the cable protruding through the bottom of the hook. In other words, a seat is formed within the hook which prevents the ferrule from being pulled out through the bottom of the hook. To release the ferrule the same must be pushed up and out through the opening through which it was entered. A passage is provided in the upper end of the hook through which the cable is passed prior to socketing the other ferrule thereon.

At the landing enough slack must be pulled to release the ferrule. To pull this slack and remove the ferrule from the hook is a difficult time-consuming job. This job requires the services of a man whose pay is $25 per day at the present rate. One may say that another objective is to save this $25. However, this man's pay is not the only saving, for a "Cat" or a "Donkey" is tied up while the log is being released. With my invention no time is lost at the landing and no time is lost in releasing the log.

Figures 4, 5:
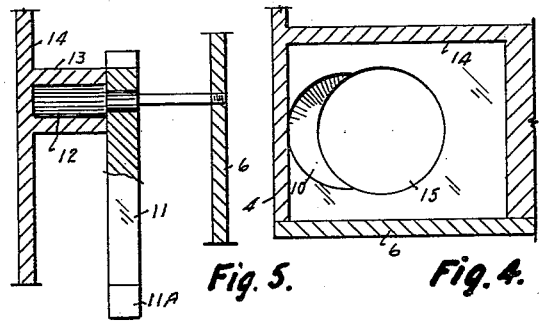
Figure 1:
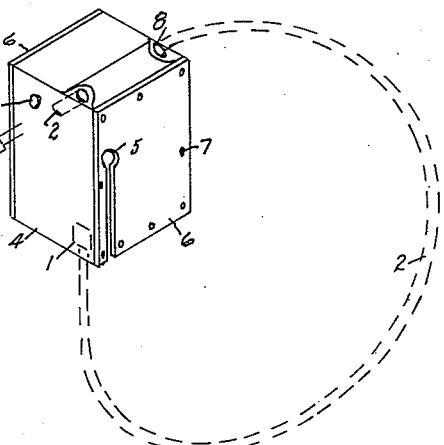
Figure 6:
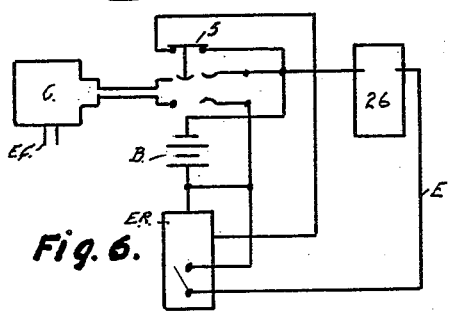
Figure 3:
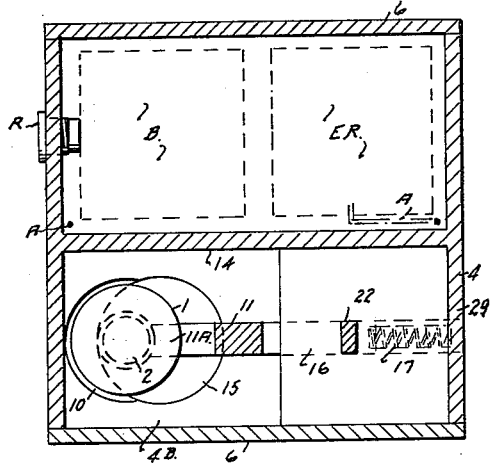
Figure 2:
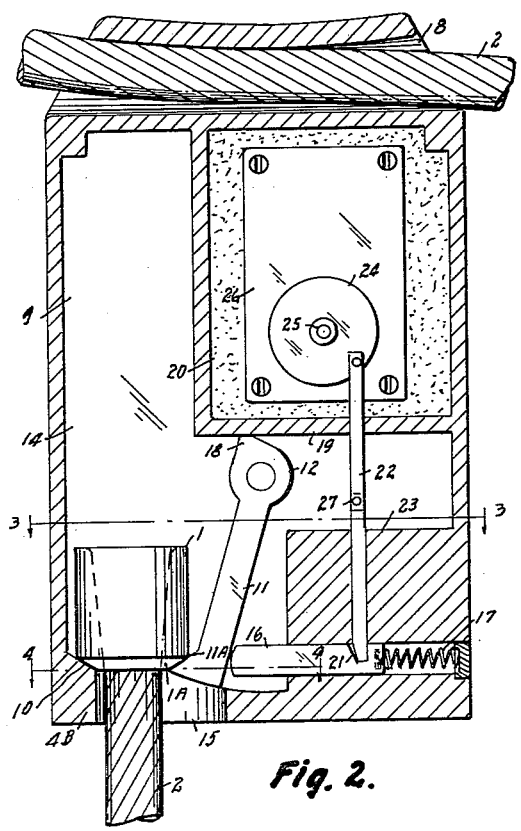
Figure 7:
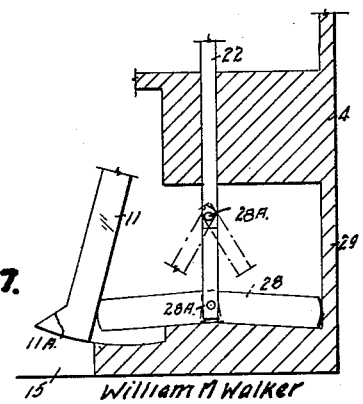
Figure 9:
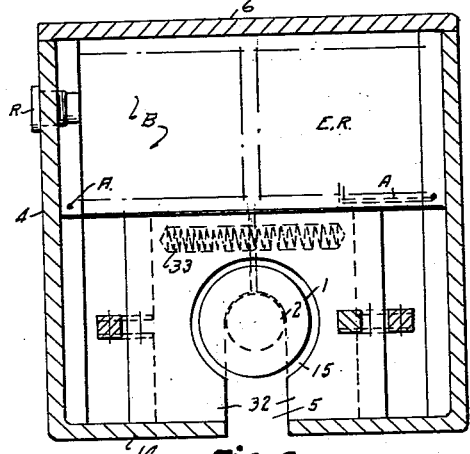
Figure 10:
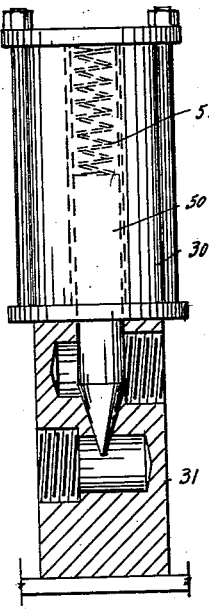
Figure 12:
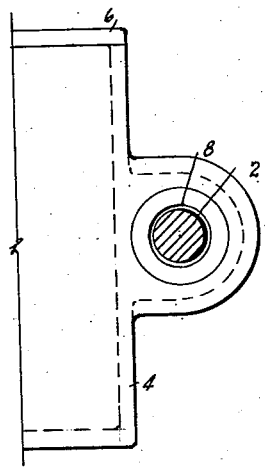
Figure 8:
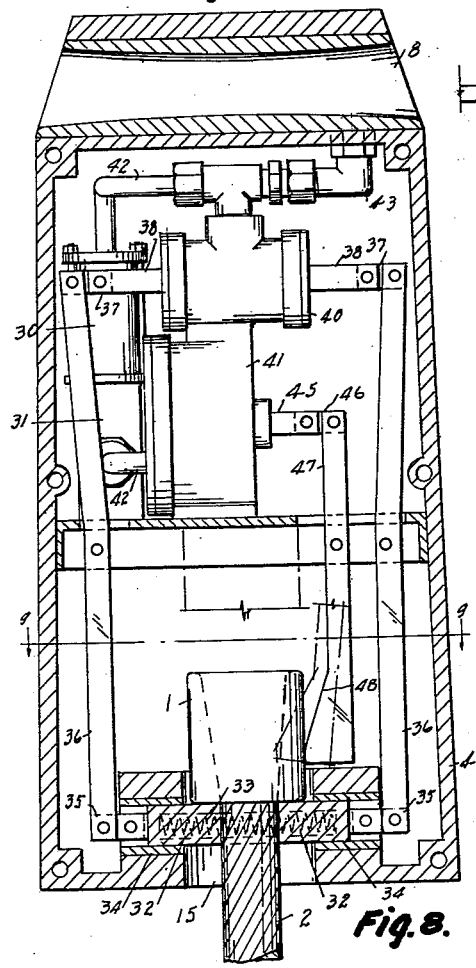
Figure 11:
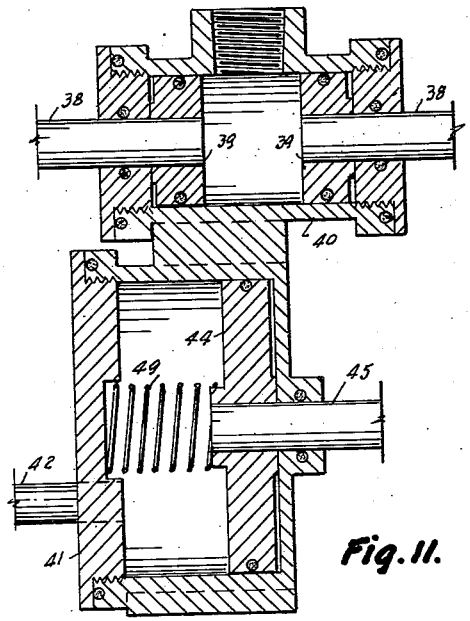

FIG. 1 of the accompanying drawings shows the relationship of the choker and the choker hook as the choker might be looped around a log; FIG. 2 is a vertical section through the choker hook on the center line of the choker ferrule; FIG. 3 is a horizontal section through the ferrule on the line 3—3 of FIG. 2; FIG. 4 is a horizontal section through the ferrule on the line 4—4 of FIG. 2; FIG. 5 is a vertical section through the bearing for the pendulous arm present when a servo-motor is used; FIG. 6 is a diagram of the electric circuit supplying the servo-motor or the solenoid operating the needle valve when a needle valve is used as it is in one version of the choker hook; FIG. 7 is a partial elevation showing a toggle joint arrangement for the control of the pendulous arm; FIG. 8 is a vertical section through the choker hook ferrule when a hydraulic system is used to operate the chocks supporting the ferrule; FIG. 9 is a horizontal section on the line 9—9 of FIG. 8; FIG. 10 is a vertical section through the needle valve shown in FIG. 8; FIG. 11 is a vertical section through the master cylinder and the two chock-operating cylinders; FIG. 12 is a top view showing the choker positioned at the side of the choker casing instead of at the top.

Throughout the drawings and the specification similar numerals refer to similar parts.

In this application two adaptations, and one modification of one of them, is shown of my remote control radio frequency operated chock-releasing means. Many deviations and arrangements may be made from the structures shown and described without departing from the basic idea. Therefore, I do not limit my invention to the exact disclosures but extend it to all that comes fairly within the scope of the appended claims.

Choker cables are made from ½" to 1¼" 8/19 plough steel wire rope, the size and length depending upon the timber being logged. The cylindrical ferrules socketed on each end of the cable range from 1¼" x 2 to 2¼" x 3½". How these ferrules are socketed on the cable with lead or babbitt is so well known to those skilled in the art as to require no further description.

FIG. 2 shows the relationship of the elements as a choker is looped around a log. This general relationship is also present when the "Bardon" hook is used.

FIG. 1 shows the ferrule 1 socketed on one end of the choker 2 (cable) and the ferrule 3 on the opposite end of said choker 2 for reception in the ferrule-receiving means carried by the "Cat" or the "Donkey" rigging (none being shown). FIG. 1 also shows the ferrule 1 about to be entered within the choker hook casing 4. The side wall or cover plate 6 is secured to the casing 4 by the screw 7 and is thus removable from the casing 4 to permit interior milling of said casing 4 and for assembling other units within the casing.

FIG. 2 shows the ferrule 1 in position with the choker 2 depending from the choker hook casing 4. FIG. 2 also shows the choker hook casing 4 provided with a passage 8 in the upper portion thereof for the choker 2 before the ferrule 3 is socketed thereon.

The interior of the choker hook casing 4 is compartmented and faced so that the cover plate 6 may form a tight seal to keep out dirt and water through which the hook is often dragged. The central compartment 9 provides for easy entering and seating of the ferrule 1 whose bottom face 1A is convexly formed and adapted to engage the semi-circular dished seat 10 formed in the bottom portion 4B of the choker hook casing 4. The dished seat 10 provides support for the ferrule 1 on one side thereof while the opposite side of the ferrule 1 is supported by the complementary seating portion 11A of the pendulous arm 11 whose upper end is provided with a cylindrical boss 12 adapted to seat in the bearing formed for its reception in the boss 13 carried by the choker hook side wall 14 oppositely disposed to the cover plate 6. This complementary ferrule seating portion 11A, which serves as a chock, is adapted to swing clear of the bottom opening 15 formed in the bottom portion 4B of the choker hook casing 4 for the egress of the ferrule 1 therethrough.

It is to be noted that the opening 15 in the bottom portion 4B of the casing 4 is off center with relation to the semi-circular dished seat 10 for the ferrule 1 whereby the ferrule 1 may move downwardly and laterally off its seat 10 and through the opening 15 when not restrained. In FIG. 2 the restraining means consists of the slide 16 adapted to engage the bottom portion of the pendulous arm 11 through the action of the compression spring 17. When the arm 11 is engaged by the slide 16 and moved to the end of its stroke, which is fixed by the lug 18 on the boss 12 coming in contact with the wall portion 19 of the compartment 20 of the choker hook casing 4, an upwardly diverging groove 21 formed in the upper face of the slide 16 is positioned to receive the end of the stop rod 22 which is vertically movable through the guide 23 formed as part of the choker hook casing 4. This stop rod 22 serves to hold the complementary seat 11A on the pendulous arm 11 in contact with the convex end of the ferrule 1.

The stop rod 22 is connected for vertical movement up and down to the crank arm 24 secured to output shaft 25 of a servo-motor 26 a motor well known as means for effecting mechanical movement of elements of various devices as not to require more detail. It is to be noted that the stop rod 22 is jointed at 27 to permit vertical movement of its lower portion.

FIG. 7 shows a toggle joint arrangement in which the member 28 is hingedly connected at one end thereof to the end of the rod 22′ at 28A.

So far the means for releasing the ferrule 1 through the bottom of the choker hook casing 4 has been through the agency of a servo-motor 26 whose operating current is cut in by remote control. In the version of my hook about to be described (FIG. 8) the control apparatus cuts in the current to energize a solenoid 30 to operate a needle valve 31 which controls the flow of fluid in a hydraulic operated means which may hold or release the ferrule 1 from the casing 4.

In both versions of my hook, as set forth, the choker 2 is threaded through the choker hook casing 4 and provided with a ferrule at each end thereof as 1 and 3. The passage 8 for the choker 2 may be at the side of the choker hook casing 4 as indicated in FIG. 12, or at the top of said casing as shown in FIGS. 2 and 8.

In this version (FIG. 8) the T-shaped opening 5 is formed in the casing side wall 14 while the removable cover plate 6 remains solid, so to speak, for a purpose to be later set forth.

In the present version (FIG. 8) the ferrule 1 drops straight through the opening 15 in the bottom of the choker hook casing 4 when the oppositely disposed supporting chocks 32 are moved from beneath the ferrule 1. The ferrule 1 has a flat bottom instead of being convexly formed as in FIG. 2.

The oppositely disposed substantially L-shaped chocks 32, when in contact, provide a substantially U-shaped support for the ferrule 1 and are closed about the choker 2 against spring pressure, the spring 33 being shown in FIGS. 8 and 9.

The chocks 32 are slidable endwise in the guides 34 formed in the choker hook casing 4 and are each connected by the linkage 35 to the lever 36 which in turn is connected through the linkage 37 to the rod 38 of the piston 39 movable by fluid, admitted to the cylinder 40, which acts on both pistons 39 simultaneously. Fluid is admitted to this dual cylinder 40 from the master cylinder 41 by means of the fluid line 42 which has one branch which terminates in a check valve 43 which serves to emit air from the hydraulic system and to admit fluid to said system. Fluid passing through the fluid line 42 from the master cylinder 41 to the dual cylinder 40 moves through a solenoid-operated needle valve 31. The source of current for the operation of the solenoid 30 is from the battery B.

Within the master cylinder 41 is a piston 44 having a rod 45 connected by the linkage 46 to the lever 47 formed with a downwardly flared contacting surface 48 adapted to be engaged by the ferrule 1 as it moves downwardly to its seat on the supporting chocks 32.

As the ferrule 1 moves downwardly to its seat over the flared surface 48 of the lever 47 it forces said lever to the right and the piston 44 of the master cylinder 41 to the left against the compression spring 49. As a consequence fluid from the master cylinder 41 is forced through the needle valve 31, provided said needle valve is open, to the dual cylinder 40.

When fluid is forced into the dual cylinder 40 from the master cylinder 41 the reaction is to move the chocks 32 toward each other to provide the U-shaped support for the ferrule 1. When the chocks 32 come together the needle valve 31 is closed by spring pressure and remains closed until it is opened at the landing by remote control to release a log. The needle valve 31 is opened by energizing its solenoid 30 which functions to lift the plunger 50 against the compression spring 51 which serves to force the plunger down to close the valve when the current is off.

When the needle valve 31 is opened the compression spring 33 disposed between the chocks 32 forces said chocks away from each other and from beneath the ferrule 1 to permit it to drop through or be pulled through the opening 15 in the bottom of the choker casing 4. The reaction from the backward movement of the chocks 32 is to force the fluid out of the dual cylinder 40 back to the master cylinder 41 which is cleared for the reception of said fluid by the compression spring 49 therein.

The fluid from the dual cylinder 40 flowing into the master cylinder 41 together with the spring 49 therein acts on the master cylinder piston 44 to cause the flared surface 48 of the lever 47 to be returned to a position whereby it may be again engaged by a downwardly moving ferrule 1 to its seat upon the chocks 32.

Before it reaches its seat the ferrule 1 has forced the lever 47 back whereupon fluid is forced from the master cylinder 41 into the dual cylinder 40 and as a consequence the chocks 32 are brought together to form a U-shaped support for the ferrule 1.

The electric circuit shown in FIG. 6 applies to the servo-motor arrangement shown in FIG. 2 or the solenoid operated needle valve arrangement shown in FIG. 8.

The electric current to supply either the servo-motor or the solenoid is furnished by the battery B which is of the nickel-cadmium type re-chargeable when needed. A receptacle R adapted to be connected with the charger C is carried by the choker hook casing 4. FIG. 6 shows a diagram of the electric circuit E in which are shown the battery B, the receptacle R, the switch S, the servo-motor 26, and the electronic relay receiver ER. When the battery charger C is connected to a source of AC current as EC and to the receptacle R, the switch S is opened removing current from the electronic relay in the receiver ER and permitting said current to flow into the battery B. When not being charged, current from the battery B flows through the switch S and then back to energize the electronic relay in the receiver ER. The "Cat" carries a remote control oscillator (not shown). This is a small transistorized radio frequency oscillator operating in the citizens band. When a push button is depressed on the oscillator, current flows from a self-contained battery to a crystal and transistor permitting a signal to be transmitted. When the electronic relay in the receiver ER receives a signal from the remote oscillator, contacts close which permits current to flow to the servo-motor 26 or, if a solenoid 30 is to be used with a needle valve 31, to the solenoid. The antenna A for the receiver ER is shown as an open loop of insulated wire positioned within the choker hook casing 4 but, like other commercial elements, may be of other suitable form for a particular choker hook.

It is to be noted that the battery B, the battery charger C, the switch S, the servo-motor 26, and even the oscillator (not shown) are commercially available and hence have not been minutely described.

It is also to be noted that the "Cat" operator is usually present when a choker is being applied to a log and has control of the oscillator to close the chocks which provide the support of the ferrule during pre-determined periods of time and open said chocks when it is desired to release a ferrule from the choker hook casing. However, a second oscillator may be used by the rigging crew in case the "Cat" operator is not present.

Having described my invention and how it works, I claim:

1. In a logging device in combination with a choker having a ferrule socketed on both ends thereof, a choker hook having a hollow casing formed with an opening therethrough for the passage of the choker, a side wall having a T-shaped opening therethrough for the entry of a ferrule into the casing, a bottom portion of said casing having an opening therethrough through which the ferrule can pass, a separable ferrule support positioned above the bottom opening which is adapted to retract automatically unless restrained to permit the ferrule to pass out the bottom opening of the casing, means to effect said retraction, means to prevent said retraction during predetermined periods of time, and controlling means to effect and restrain the retraction which includes a radio frequency oscillator and an electronic relay in a receiver, said relay being operable upon a signal from the oscillator to control both the effecting and restraining means.

2. In a choker hook which includes a hollow casing having a portion with a passage therethrough for the reception of a choker said choker having a ferrule socketed on each end thereof said ferrule having a convex bottom portion said casing having a side wall provided with a T-shaped opening for entry of one of the ferrules into the casing said casing having a bottom portion through which the ferrule can pass; the improvement which includes a semi-circular dished ferrule-supporting seat formed in the bottom portion of the casing, an oppositely disposed ferrule-supporting chock said chock being adapted to be swung clear of the ferrule to permit it to slide off its seat laterally and drop through the bottom casing opening unless restrained, means to restrain movement of the ferrule-supporting chock which includes a movable stop, a servo-motor adapted to operate the stop, a source of current for said motor, and a remote control radio frequency operated mechanism for controlling the source of current to the servo-motor.

3. The structure of claim 2 in which the restraining means includes a spring-backed slide having a groove in its upper face and in which the stop means includes a jointed guided rod adapted to be moved up and down by the servo motor to engage the groove in the slide at predetermined times.

4. The structure of claim 2 in which the restraining means includes a toggle joint having a pair of aligned members hingedly connected together at their adjacent ends and to one end of the movable stop said stop consisting of a guided jointed rod whose opposite end is hingedly connected to a crank arm on the servo motor.

5. In a choker hook which includes a hollow casing having a portion with a passage therethrough for the reception of a choker said coker having a ferrule socketed on each end thereof said casing having a side wall provided with a T-shaped opening for entry of one of the ferrules into the casing said casing having a bottom opening through which the ferrule can pass; the improvement which includes a pair of oppositely disposed chocks positioned adjacent the bottom of the casing and slidable toward each other to form a U-shaped seat for the support of a ferrule when the same is within the casing, a compression spring adapted to force the chocks apart, means to bring the chocks together against the spring pressure said means including a chock-operating cylinder operably connected to each of the chocks, a master cylinder having a spring-backed piston therein, a fluid line connecting the master cylinder with the chock-operating cylinder, a self-closing needle valve in the fluid line, a solenoid operable to open the needle valve, a source of electric current to operate the solenoid, a lever operably connected at one end thereof to the master cylinder the other end of said lever having a downwardly flared surface normally held in the path of a ferrule being seated within the casing by the spring behind the piston of the master cylinder whereby said ferrule on moving to its seat on the chocks forces the flared portion of the lever to the right and the piston of the master cylinder to the left to force fluid out of said master cylinder into the chock-operating cylinders to bring the chocks together to form the U-shaped seat for the ferrule, and a remote control radio frequency operated mechanism adapted to cut the current supply to the solenoid to permit the needle valve to close and thus hold the chocks together for a pre-determined period of time and to energize the solenoid at the end of said period of time to open the needle valve to permit the spring between the chocks to force said chocks apart to permit the ferrule to drop through the opening in the bottom of the casing.

References Cited in the file of this patent

UNITED STATES PATENTS

| | | |
|---|---|---|
| 1,391,457 | Buckley | Sept. 20, 1921 |
| 1,864,974 | Buckley | June 28, 1932 |
| 2,981,074 | Wildner | Apr. 25, 1961 |